(12) United States Patent
Rosenberg et al.

(10) Patent No.: US 11,836,704 B2
(45) Date of Patent: Dec. 5, 2023

(54) TRANSACTION TERMINAL WITH CODE SCAN FOR PAYMENT

(71) Applicant: VenueNext, Inc., Santa Clara, CA (US)

(72) Inventors: Edan Rosenberg, Princeton Junction, NJ (US); Anthony Perez, Orlando, FL (US); Frank Conway, South Orange, NJ (US)

(73) Assignee: VENUENEXT, INC., Santa Clara, CA (US)

( * ) Notice: Subject to any disclaimer, the term of this patent is extended or adjusted under 35 U.S.C. 154(b) by 0 days.

(21) Appl. No.: 17/677,559

(22) Filed: Feb. 22, 2022

(65) Prior Publication Data

US 2022/0237587 A1  Jul. 28, 2022

Related U.S. Application Data

(63) Continuation of application No. 16/723,953, filed on Dec. 20, 2019, now Pat. No. 11,257,064.

(51) Int. Cl.
| | |
|---|---|
| *G06Q 20/32* | (2012.01) |
| *G06K 7/10* | (2006.01) |
| *G06Q 20/20* | (2012.01) |
| *G06K 7/14* | (2006.01) |

(52) U.S. Cl.
CPC ..... *G06Q 20/3276* (2013.01); *G06K 7/10722* (2013.01); *G06K 7/1417* (2013.01); *G06Q 20/20* (2013.01)

(58) Field of Classification Search
CPC ... G06K 7/1417; G06Q 20/20; G06Q 20/3276
USPC .......................................................... 705/16
See application file for complete search history.

(56) References Cited

U.S. PATENT DOCUMENTS

| | | |
|---|---|---|
| 2014/0136348 A1 | 5/2014 | Carroll |
| 2019/0066089 A1 | 2/2019 | Miryala |

OTHER PUBLICATIONS

Rosenberg, U.S. Appl. No. 16/723,953, filed Dec. 20, 2019, Office Action, dated Jun. 17, 2021.
Rosenberg, U.S. Appl. No. 16/723,953, filed Dec. 20, 2019, Notice of Allowance and Fees Due, dated Oct. 12, 2021.

*Primary Examiner* — Toan C Ly
(74) *Attorney, Agent, or Firm* — Hickman Becker Bingham Ledesma LLP

(57) ABSTRACT

A method and apparatus for generating visually perceivable data representing a digital order of goods or services is provided. In an embodiment, visually perceivable data is generated and displayed at first device representing a digital order which is the subject of a transaction. In an embodiment, a second device receives digital data comprising a digital image and determines the digital image matches the visually perceivable data. In an embodiment, the second device receives data representing the digital order in response to determining the digital image matches the visually perceivable data. In an embodiment, the second device completes a digital transaction after receiving the digital order.

20 Claims, 10 Drawing Sheets

TRANSACTION TERMINAL WITH CODE SCAN FOR PAYMENT

BENEFIT CLAIM

This application claims the benefit as a continuation of application Ser. No. 16/723,953, filed Dec. 20, 2019, by Edan Rosenberg et al., the entire contents of which is hereby incorporated by reference. The applicant hereby rescinds any disclaimer of claim scope in the parent applications or the prosecution history thereof and advise the USPTO that the claims in this application may be broader than any claim in the parent application.

FIELD OF THE DISCLOSURE

One technical field of the present disclosure is electronic transactions for goods and services. Another technical field is the creation and use of digital symbols representing orders for goods and services in practical applications such as transactions in food, beverage or other tangible goods. Another technical field is scanning a digital symbol to initiate a digital transaction process as a mobile computing device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Transactions for goods and services are increasingly digitized to increase efficiency, convenience, and uniformity in sales. Moving traditional exchange of currency by hand into the realm of networks and electronic devices improves transaction throughput and creates a better experience for buyers, sellers, and intermediaries that facilitate the transactions. One example is the increased use of point of sale (POS) terminals for good and service vendors, that allow selling entities to input customer orders into an electronic system and generate digital order data. The digital data is easily transferred for display to necessary parties, such as goods vendors, food service workers, or to a screen on the POS terminal for customers to view the contents of their order.

Despite the improvement of digital transaction services over analog counterparts, problems with current technology continue to affect customers, sellers and intermediary services. For example, the use of POS terminals requires that each order be input individually at a POS device and each order must be handled sequentially. As a result, customer seeking to place an order at a POS terminal must queue up and complete a transaction process from beginning to end at the POS device. When a limited number of POS devices or a large number of customers exist, queues become much larger and slow the overall order throughput rates. As a result, customer satisfaction plummets, vendors lose money from potential sales, and great strain is placed on the electronic resources of intermediary transaction services.

A common use of a POS terminal involves a customer placing an order, an attendant or autonomous software program building the order digitally, presenting the customer with the details of the order, presenting a payment opportunity to the customer, and the customer completing the payment opportunity. Each step of this process in subject to error that will adversely affect the throughput of order transactions. A customer must wait at the POS terminal to be presented with the details of the order. Even if the order details are correct, the customer must then wait to be presented with payment options and complete the transaction a payment option of their choice using the POS terminal. During this time, the POS terminal is idle and wasting resources while other customers waste time waiting to input another order. Use of a specific or specialized form a payment, such as a customer loyalty or rewards card will further increase the time spent completing a transaction at the POS terminal and further decrease order throughput rates.

DETAILED DESCRIPTION

Figure 1:
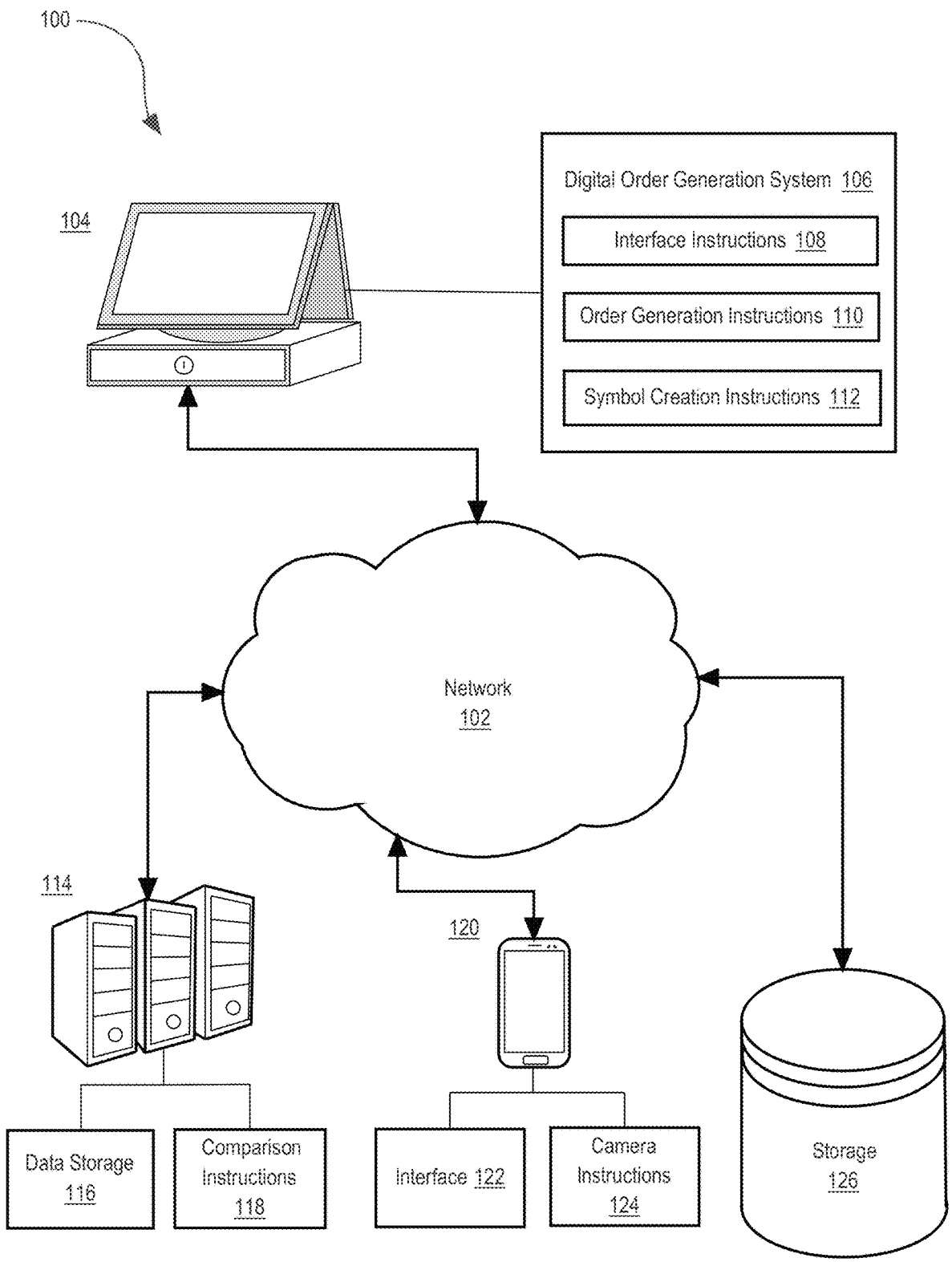
FIG. 1 illustrates an example networked computer system with which an embodiment may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. General Overview

In various embodiments, a computer implemented method facilitates the transfer of digital order data from an order generation terminal to a personal mobile computing device to complete a transaction on an individual basis. An order is specified at a first terminal and digital data corresponding to the order may be created representing one or more aspects of the order. The terminal creates a link between the created order data and a mobile computing device sufficient for the device to retrieve the order and complete the associated transaction for the order individually. Once the terminal has facilitated the link, the terminal may begin generation of new data representing a different digital order to be linked to a different mobile computing device.

The computer-implemented method may be utilized to generate, by a first device comprising a screen, visually perceivable first data representing a digital order of goods or services. The first device may be a POS system with which a vendor may generate order data listing of goods or services. The order data may be represented by first data such as a unique digital symbol that represents the particular order data that was generated. The first device may then display, on the screen of the first device, the unique symbol representing the digital order.

The computer-implemented method may be further utilized to receive, by a second device, second data representing a first digital image. The second device may be an individual mobile computing device such as a cellular phone comprising a digital screen, camera and networking hardware. The second data may be a digital photograph that contains the unique symbol. A determination may be made that the digital photograph contains the unique symbol and responsively initiate a transaction process on the mobile computing device.

The computer-implemented method may be further utilized to receive, by the second device, third data representing the digital order. The third data may be the order data that was generated by the POS system and that is represented by the unique symbol. The order data may be received over a network by the mobile computing device directly from the POS system or server on which the POS system stores generated order data. Once the order data is received by the mobile computing device, the mobile computing device may display the digital order on a display screen for review by a user.

The computer-implemented method may be further utilized to receive, at the second device, an indication of approval of the third data. The indication may be made in response to a user of the mobile computing device approving the order data subsequent to viewing it on the screen of the mobile computing device. When the indication of approval of the order data is made, the mobile computing device may initiate a transaction process for digital payment of the set of the goods or services. A transaction process may comprise approving a payment of currency such as money or digital rewards points in an appropriate amount in exchange for the goods and/or services specified in the order data.

The computer-implemented method described above facilitates a digital order transaction system that implements the most inefficient actions performed at a POS system on individual network-enabled mobile computing devices. A system that facilitates order review, payment options, and payment completion on an individual basis separate from the POS system allows customers to complete the most arduous portions of a transaction individually and liberates use of the POS terminal systems for subsequent digital order generation. Interaction between a POS terminal system and a mobile device improves order throughput and improves customer, and vendor experience alike.

Computing resources are more efficiently utilized by intermediary services as stored order data is generated and recycled at faster rates and customers can complete transactions at a more comfortable pace. For example, using a traditional POS terminal, order data is created and stored with the generation of each order and deleted with the completion or fulfillment of each order in a sequential manner. Because traditional POS methods requiring queueing, a relatively small amount of computing resources is utilized, and data is created and recycles at much slower rates. When the completion of a transaction is disseminated to individual mobile devices, orders can be stored more quickly, improving order throughput by utilizing a more substantial portion of valuable computer resources efficiently.

2. Example Computing Environments and Computer Components

FIG. 1 illustrates an example networked computer system with which various embodiments may be practiced. FIG. 1 is shown in simplified, schematic format for purposes of illustrating a clear example and other embodiments may include more, fewer, or different elements. System 100 comprises various entities and devices that may be used to practice an implementation. Network 102 is a network entity that facilitates communication between entities depicted in FIG. 1. Connection to network 102 is show by double-sided arrows between a connecting entity and network 102. Network 102 may be any electronic communication medium or hub that facilitates communications between two or more entities including, but not limited to, an internet, an intranet, a local area connection, a cloud-based connection, a wireless connection, a radio connection, a physical electronic bus, or any other medium over which digital and electronic information may be sent and received. The coupling of network 102 to any entity in system 100 may comprise any connection sufficient to facilitate data sharing or communication between the entities, including the means described above and possibly including a hard-wired connection, a wireless connection, a cloud-based connection, and/or a digital signal-based connection.

Network 102 is coupled to transaction generation device 104. Transaction generation device 104 may be any entity, including a device comprising hardware and software, that facilitates the generation of order data representing a digital order for goods and/or services. In various embodiments, transaction generation device 104 is a point of sale terminal or device that is used to generate digital order data manually by a human operator or automatically based on some input. In various further embodiments, such a point of sale terminal or device comprises one or more screens and input means to display and interact with information created and received by transaction generation device 104.

Transaction generation device 104 comprises digital order generation system 106. Digital order generation system 106 may be any hardware, software, entity, or device that facilitates generation of a digital order corresponding to a transaction for goods and/or services. Digital order generation system 106 comprises interface instructions 108, order generation instructions 110 and symbol creation instructions 112. Interface instructions 108 may be any set of digital instructions, protocols, source code, and/or software that facilitates a digital interface on transaction generation device 104. In various embodiments, interface instructions 108 facilitate a user interface that enables on transaction generation device 104 to receive input from a human operator or display input to a human operator related to digital order data representing an order for goods and/or services.

Order generation instructions 110 may be any set of digital instructions, protocols, source code, and/or software that facilitates generation of digital order data on transaction generation device 104. In various embodiments, order generation instructions 110 facilitate the creation of digital order data by transaction generation device that represents an order for goods and/or services. Symbol creation instructions 112 may be any set of digital instructions, protocols, source code, and/or software that facilitates generation of a digital symbol to associate with order data generated on transaction generation device 104. In various embodiments, symbol creation instructions 112 facilitate the creation of a symbol for display on transaction generation device 104 which is visible and recognizable by a mobile device that will receive the generated order data. In various embodiments not pictured in FIG. 1, digital order generation system 106 or any parts thereof may be coupled directly to any other entity depicted in system 100 by a network or digital connection such as network 102.

Network 102 is coupled to server 114. Server 114 may be any combination of singular or groups of electronic servers. One or more servers may comprise hardware, software and/or connections which facilitate a server system for storing digital data such as digital order data. In various embodiments, server 114 received orders generated by transaction generation device 104 for storage in an internal or external digital memory medium. Server 114 comprises data storage 116. Data storage 116 may be any hardware, software, or entity capable of storing digital data such as digital order data as discussed herein. Server 114 comprises comparison instructions 118. In various embodiments, comparison instructions 118 facilitate a comparison between two or more sets of data stored and/or received by server 114. For example, digital data representing a first symbol related to a digital order may be compared to received data representing a picture or digital image of a second symbol. Comparison instructions 118 may facilitate a comparison between the first and second symbols to ensure that the symbols match in order to validate a request to receive digital data representing a digital order.

Network 102 is coupled to server 114. Server 114 may be any combination of one or more electronic servers. Server 114 may comprise hardware, software and/or connections which facilitate a server system for storing digital data such as digital order data. In various embodiments, server 114 receives orders generated by transaction generation device 104 for storage in an internal or external digital memory medium. Server 114 comprises data storage 116. Data storage 116 may be any hardware, software, or entity capable of storing digital data such as digital order data as discussed herein. Server 114 comprises comparison instructions 118. In various embodiments, comparison instructions 118 facilitate a comparison between two or more sets of data stored and/or received by server 114. For example, digital data representing a first symbol related to a digital order may be compared to received data representing a picture or digital image of a second symbol. Comparison instructions 118 may facilitate a comparison between the first and second symbols to ensure that the symbols match in order to validate a request to receive digital data representing a digital order.

Network 102 is coupled to mobile device 120. Mobile device 120 may be any entity, hardware, or software-based device which is capable of interacting with network 102. Mobile device 120 may be capable of facilitating use of a software application for completing a transaction process comprising exchanging digital currency for an order. In various embodiments, mobile device 120 is a device implementing a software application which is capable of capturing a digital image comprising a unique symbol representing order data. The software application may the confirm the captured digital image corresponds to a specific order, receive data representing the order, and complete a transaction process to pay for the order. Mobile device 120 comprises interface 122 through which a user may interact with a software application to facilitate these processes. Camera instructions 124 may be part of the interface 122 or separate, and allow the mobile device 120 to capture a digital image which may contain a unique symbol for order matching.

Storage 126 may be any number of individual or linked storage devices or mediums that allow the storage of digital data related to the order data and transaction processes discussed herein. For example, storage 112 may store local data in a fashion similar to server 114. In various embodiments, storage 112 comprises digital software comprising digital order generation system 106 which is connected to transaction generation device 104. In various implementations, system 100 is designed to execute process 200 described below. In various embodiments not pictured in FIG. 1, additional devices such as additional POS terminals, vendor computers, data tracking systems, or financial databases may be coupled to network 102 and therefore the other entities of system 100.

3. Example Processes

Figure 2:
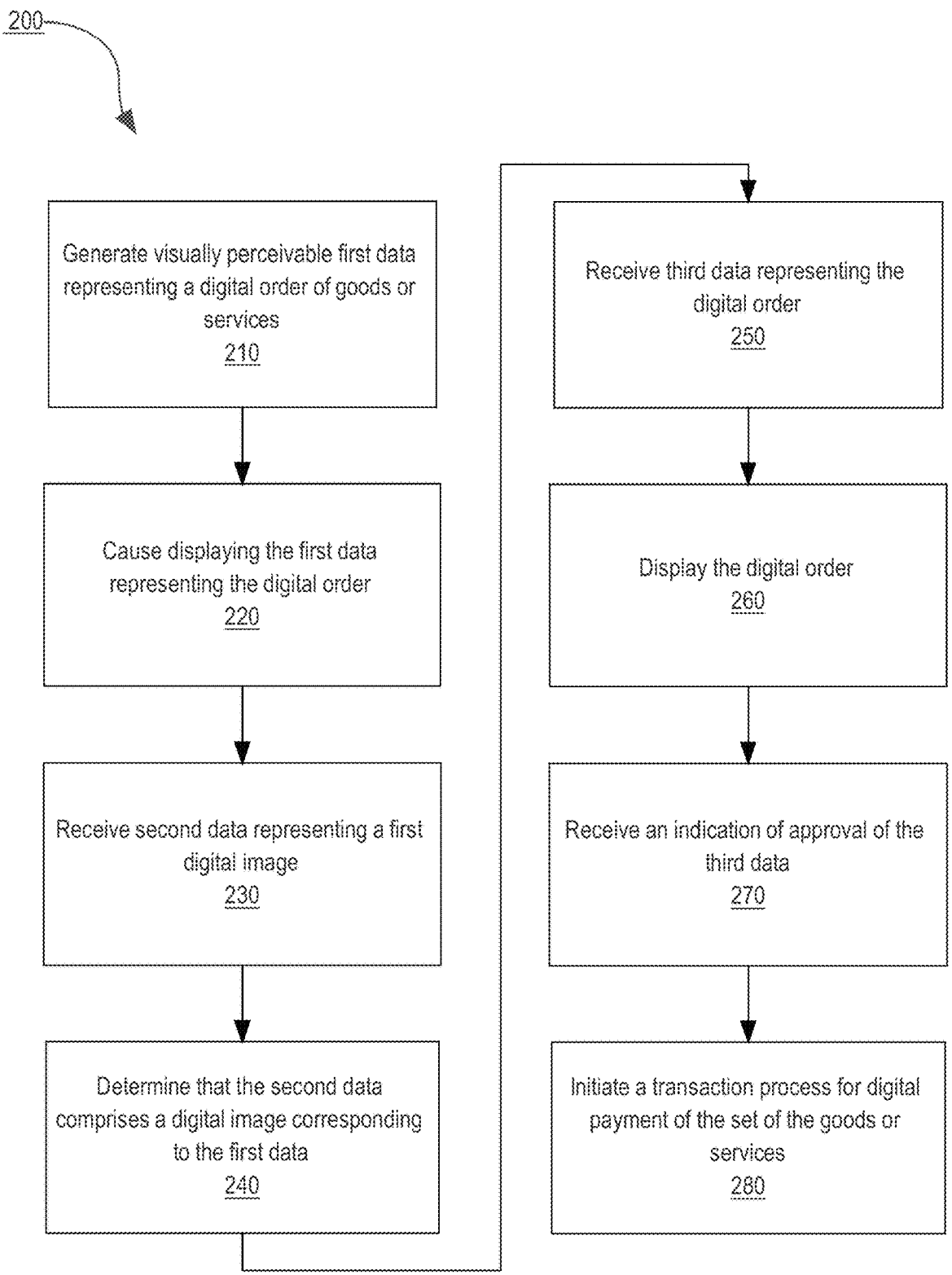
FIG. 2 illustrates a code scanning and payment process according to an embodiment.

FIG. 2 illustrates a code scanning and payment process according to an embodiment. To illustrate a clear example, FIG. 2 and certain other diagrams are discussed in the context of FIG. 1, but other embodiments could be performed using arrangements other than as shown in FIG. 1. FIG. 2, and each other process diagram or flow diagram herein is intended as a plan, algorithm, or specification for programming one or more computer programs or other software elements to implement the functions that are represented in the diagrams, and is expressed at the same level of detail as customarily used by persons having ordinary skill in the art to which this disclosure pertains to communicate among themselves about software architecture and program flow at development stages before actual coding is undertaken. Furthermore, all functional statements in the description of FIG. 2, FIG. 5, FIG. 6, FIG. 7, FIG. 8, FIG. 9, and FIG. 10 are intended to describe programmed, executable machine operations of one or more of the elements of FIG. 1, FIG. 3, FIG. 4, unless the context indicates otherwise; that is, the disclosure is directed to particular machines programmed to execute in a particular way to execute or implement the specified functions, and/or digital storage media recorded with executable instructions that can be loaded and executed in a machine to perform the specified functions, and their practical applications, and is not directed to ideas in the abstract, concepts or functions alone.

The example process 200 depicted in FIG. 2 comprises generating visually perceivable first data representing a digital order of goods or services; displaying the first data representing the digital order after which a device may receive second data representing a first digital image; determining that the second data comprises a digital image corresponding to the first data; in response to determining that the second data comprises a digital image corresponding to the first data, receiving third data representing the digital order; displaying the digital order that is received; receiving an indication of approval of the third data; and in response to receiving the indication of approval, initiating a transaction process for digital payment of the set of the goods or services.

Returning to FIG. 2, the process 200 begins at step 210 by generating visually perceivable first data representing a digital order of goods or services. The visually perceivable first data may be generated by a first device comprising a screen, such as a POS terminal or any other device capable of generating a digital order of goods or services. For example, a POS terminal on which the first data is generated may use a screen attached to the POS terminal to display the visually perceivable first data. In an embodiment, the visually perceivable first data is a symbol which is recognizable by a device and/or a human. In various further embodiments, the symbol is a QUICK RESPONSE CODE (QR CODE) which is a registered trademark of DENSO WAVE INCORPORATED. The QR CODE is recognizable by a device which can process a digital image. In various further embodiments, the symbol is a barcode or line-based symbol. In an embodiment, the symbol comprises a series of letters and/or numbers arranged in a particular fashion.

Figure 8:
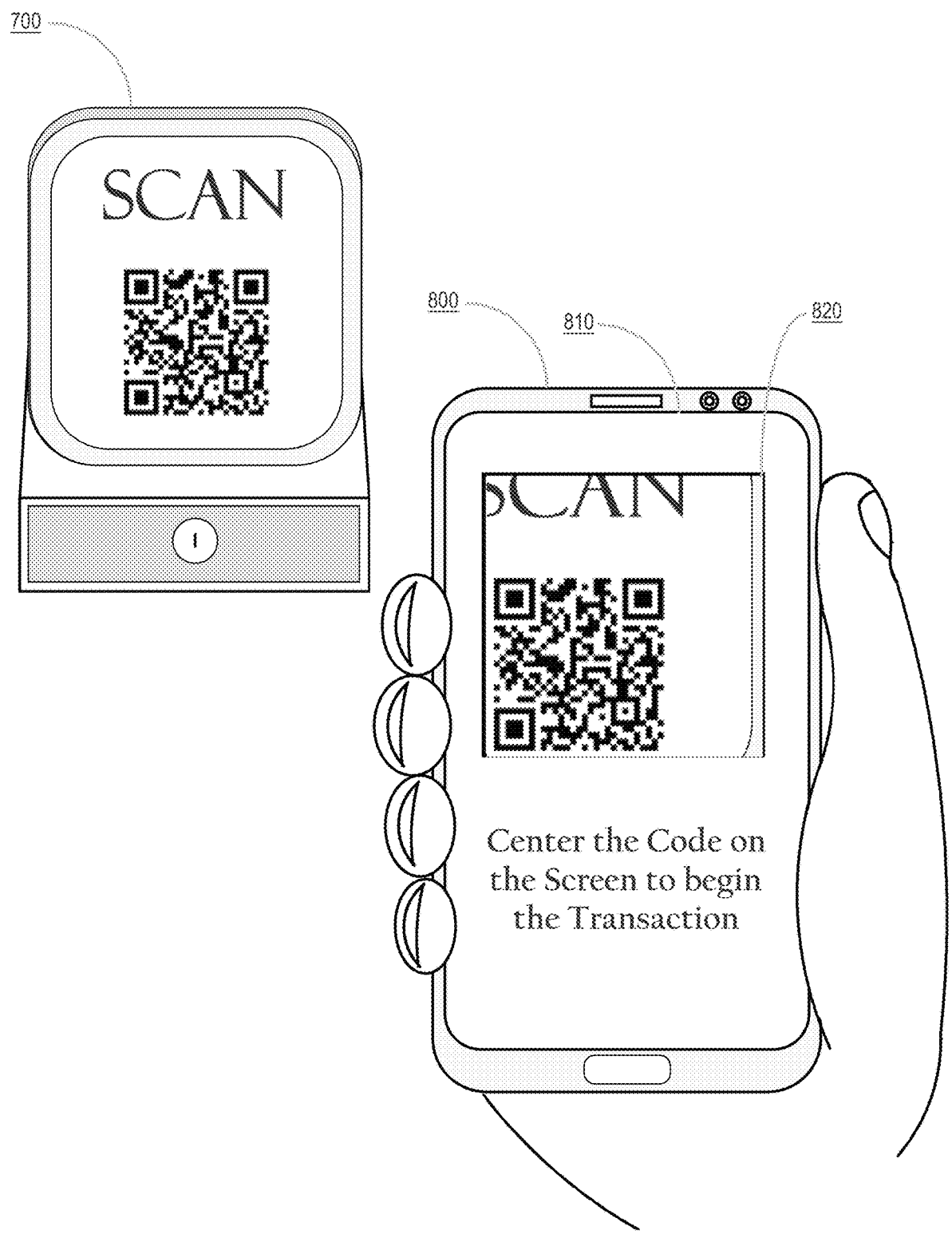
FIG. 8 illustrates an example code scanning and payment system according to an embodiment.

In an embodiment, the first data is generated at the same time the digital order is generated. In an embodiment, the first data is generated before the digital order is generated and the digital order is assigned to a preexisting copy of the first data. In an embodiment, the first data is generated after the digital order is generated and may be generated after the digital order is created and stored in a corresponding data. In various further embodiments, the first data is created in response to user input specifying that a user desires to complete a transaction using a mobile computing device. FIG. 8 illustrates an example and is further described in other sections.

At step 220, the process is programmed for displaying the first data representing the digital order. The first data may be displayed at a screen of the first device. For example, a POS terminal may display the first data after it has been generated. In an embodiment, the screen used to generate the digital order is the same screen that displays the first data. In an embodiment, the first device comprises two or more screens, including a first screen for generating a digital order of goods or services and a second screen to display the first data. In various further embodiments, the first screen for generating the digital order of goods or services is operable by human vendor and the second screen is operable by a human customer for viewing the first data.

In an embodiment, the first data is displayed on the screen in response to user input specifying that the screen should display the first data. For example, a pre-generated version of the first data may be stored electronically. The pre-generated first data may stay in storage until a user interacting with a screen of the first device specifies that the first data should be shown. The first data may be shown in any sufficient display of size, arrangement, form, color, and/or display format necessary to facilitate the processes as described herein. In an embodiment, the displayed first data is modifiable based on user interaction with the screen of the first device. For example, the displayed first data may scale to a larger size in response to user input on the screen of the first device such as a tap or scroll of the fingers by a user. Conversely, the displayed first data may scale to a smaller size in response to user input on the screen of the first device such as a double-tap or scroll of the fingers by a user.

In an embodiment, the first data may be printed on a viewable analog medium by the first device, such as a paper receipt or invoice. For example, a printed copy of the first data may be used in the instance a digital screen is unavailable. In an embodiment, the first data exists in a permanent state on a medium such as a placard or poster and the digital order that is associated with the first data changes. For example, the first data may be placed at a table for customers and the digital order that is associated with the first data may change depending on the customers currently at the table. In an embodiment, the first data may be recycled to become new data representing a new order once a previous associated order has been fulfilled. In an embodiment, the first data is displayed on a terminal such as a POS terminal. The first data is scanned by a first mobile device with a display. In response to scanning the first data on the terminal, the first data is displayed on the screen of the first mobile device. A second mobile device may then scan the first data displayed on the first mobile device to initiate a digital transaction process.

At step 230, the process is programmed for receiving second data representing a first digital image. The second data may be received by a second device which may be a mobile device that will complete a transaction for the generated order. The second data may be any data which comprises a digital image or representation of an image. In an embodiment, the first digital image is a digital image taken from a camera attached to the second device. In various further embodiments, the digital image is taken from a camera as part of a mobile application process for completing a transaction. In an embodiment, the second data is a digital image received from another device, such as the POS terminal or a separate mobile device.

At step 240, the process is programmed for determining that the second data comprises a digital image corresponding to the first data. For example, the determination may comprise determining that a portion of the digital image contains a digital representation of the first data in the form of a unique symbol. As a further example, the first data may be a QR CODE displayed at a POS terminal and the second data may be a digital image taken from a camera of a mobile device. The determination then involves comparing the digital image to the QR CODE to verify that a portion of the digital image matches the QR CODE. In an embodiment, once the determination is made that the second data comprises a digital image corresponding to the first data, a transaction process may begin at the second device as represented by steps 250, 260, 270, 280. In an embodiment, a countdown time is added to complete the digital order within a specified time frame to prevent fraudulent or inefficient activity. For example, a user may be required to complete a transaction within a time period, or the digital order will become defunct and lapse for failure to complete within the pendency of the countdown.

At step 250, the process is programmed for receiving third data representing the digital order. The data may be sent to the second device which received the second data to complete a transaction process for the digital order. The third data may be related to the digital order data generated by the first device. In an embodiment the third data is similar to the digital order data. In an embodiment the third data represents the digital order data generated by the first device in a different format readable by the second device. The third data may comprise any information relevant to the digital order. In an embodiment, the third data comprises a digital list of goods or services to be purchased when the transaction is complete. For example, the first data may include one or more edible goods from a vendor that a user has ordered at a POS terminal. In an embodiment, the first data comprises price listings for each of the goods or services in the digital order. For example, prices for edible goods in a digital order may be included in the first data in separate individual listings or in a summation price representing the total price.

In various further embodiments, prices may include incidental costs or credits, such as sales tax, local tax, luxury tax, taxes created by ordinance, user credits, user discounts, payments already made, club rewards, membership discounts, or alternative currency credits. In an embodiment, the third data comprises location information related to a location in which to complete the transaction. For example, location information may include a location for a user to pick up edible goods from a vendor or kiosk.

At step 260, the process is programmed for displaying the digital order. The digital order may be displayed on a screen of the second device to convey the order information to a user of the second device. In an embodiment, displaying the digital order comprises parsing the received third data to reconstruct the digital order on the second device. In various further embodiments, a mobile application running at the second device interprets the third data to present the digital order in a format that is readable to a human user. In an embodiment, presenting the digital order to a user of the second device comprises presenting a list of goods and/or services, a price, a location, and an interactive confirmation sector to review and complete the transaction. See FIG. 10 for an example of this embodiment.

Figure 9:
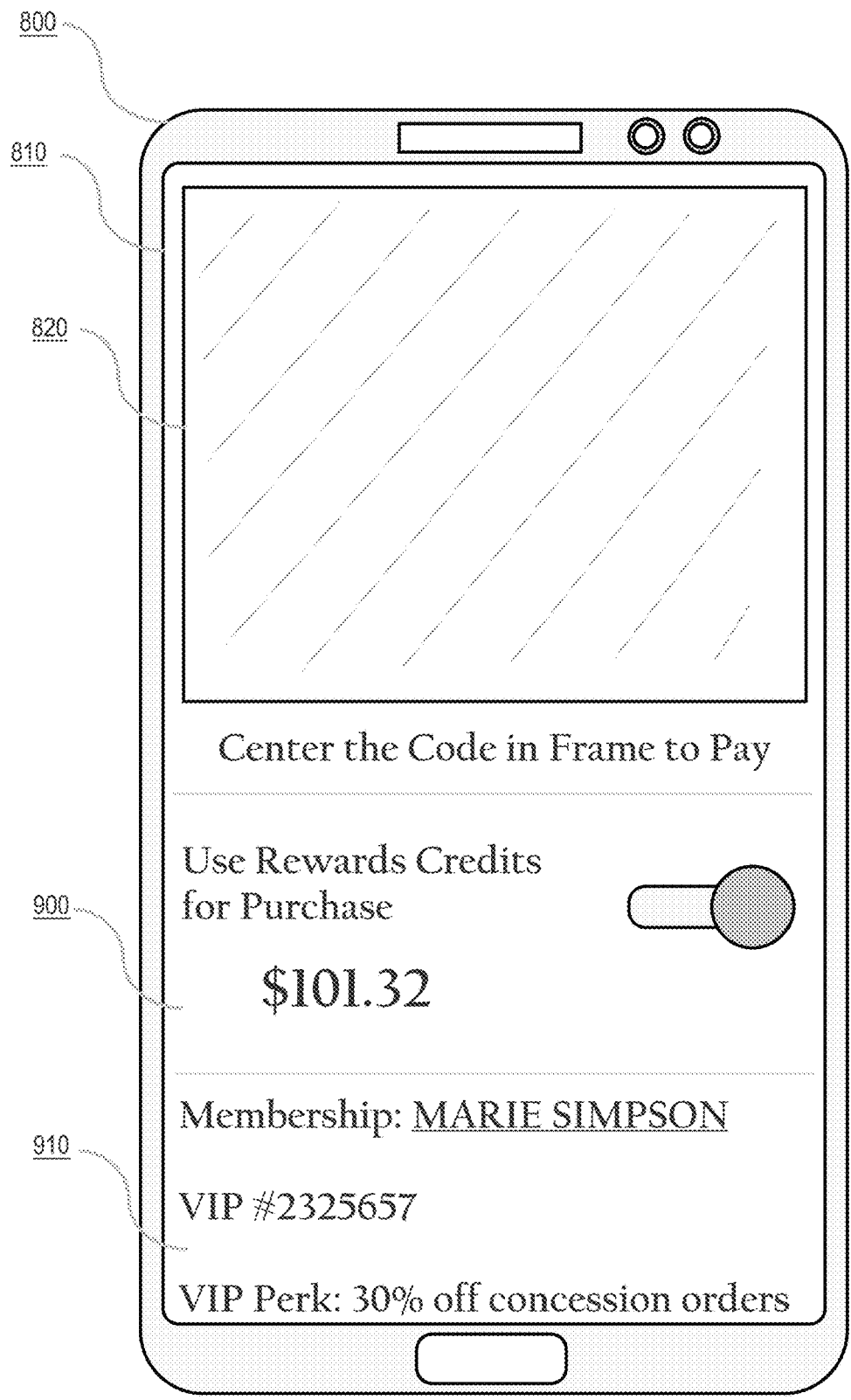
FIG. 9 illustrates an example code scanning and payment system according to an embodiment.

At step 270, the process is programmed for receiving an indication of approval of the third data. The indication of approval may be received at the second device by a user viewing the digital order and may sent in response to the user interacting with the second device in a manner which indicates the uses approval of the third data as represented by the displayed digital order. In an embodiment, a user's approval of the third data comprises receiving an indication that a user has pressed a button or otherwise interacted with the second device in a manner which signifies that the user is prepared to complete the transaction specified by the third data. FIG. 9 shows one example of this embodiment.

At step 280, the process is programmed for initiating a transaction process for digital payment of the set of the goods or services. In an embodiment the transaction process may comprise completing a digital payment form at the second device in real-time. For example, a user paying for a transaction with a credit card may fill out a credit card payment form to complete the process. In an embodiment, completing the transaction may comprise using a payment method stored at the second device or a server to pay for the goods and/or services in an order. In various further embodiments, completing a transaction with a stored payment method comprises redeeming alternative digital currencies to complete a transaction. For example, when completing an order from a vendor which accepts rewards points or other non-traditional currencies, the user of the second device may be presented with an option to complete the transaction at the second device using those options. In an embodiment, a user may be presented with an option to complete the transaction with the second mobile device or at the first device which generates the digital order. See FIG. 7 for an example of this embodiment.

In various embodiments, executing the process or steps of the process in real-time may comprise performing some or all steps of a process in rapid, responsive, or concurrent manners with respect to a present time period. For example, generating the visually perceivable first data or symbol may be performed immediately in response to the creation of digital order data or in response to some operator or customer input at a device or POS terminal. The displaying of the first data on a screen of a device may be done in a manner such that a human operator or digital device may recognize the displayed data at a present time as it is being displayed on the device. The display of the data may be done immediately in response to the generation of the first data by the first device.

In various embodiments, the second device receives the second data representing the first digital image in real-time. Receiving the second data in real-time may comprise actively refreshing a digitally captured image from a device camera and displaying the actively refreshed image on the screen of the second device. The determination of whether the first data is included in the digital image may also be performed during the reception of the second data in real time. For example, as the second device continuously displays the second data concurrent with the capture of the digital image by the camera, the device may further concurrently perform continuous determinations that the second data comprises a digital image corresponding to the first data. If a determination is made that the second data comprises a digital image corresponding to the first data, the steps or querying for or receiving the third data representing the digital order may be performed automatically. Displaying the digital order on the display screen of the second device may be done in response to receiving the third data in real-time.

In various embodiments not pictured in FIG. 2, receiving the third data representing the digital order comprises generating order data by a digital mobile device which receives the second data representing the first digital image. In various further embodiments, the digital mobile device generates the third data based on the received second data and sends the data to be received by a digital application running on the digital mobile device. The digital application may derive the digital order from the created third data and generate order data to be part of a transaction for the digital order. The generation of the third data may be performed online by connecting the digital mobile device to a server or other digital device over a network. The generation of the third data may alternatively be performed offline at the digital mobile device. For example, the digital mobile device may receive the second data and determine that the second data corresponds to a symbol or data-encoded item representing the digital order. The digital mobile device may then generate digital order data based on the symbol or the data-encoded item and display the digital order data at the digital mobile device. The digital mobile device may then use network connectivity to complete a transaction for the digital order data that was generated offline by the digital mobile device.

In various embodiments not pictured in FIG. 2, process 200 is initiated at an autonomous kiosk system or device. The use of the autonomous kiosk may comprise one of more human operators that interact with the autonomous kiosk via one or more manual input methods facilitated by the autonomous kiosk system or device. For example, a human operator may access an autonomous kiosk by creating input on a touchscreen or touchpad device at the kiosk to select items and generate an order. When the human operator inputs an indication that a digital order for items should be generated, the autonomous kiosk may generate and display the first data representing the generated digital order. In various embodiments, the user of an autonomous kiosk system may additionally select whether to complete a transaction by generating a digital symbol for scanning by a digital mobile device operated by the user or by another method such as credit card or rewards credit payment at the autonomous kiosk.

In various embodiments not pictured in FIG. 2, the first data representing the digital order may be pre-generated and placed in a static visual medium for easy scanning and processing. The pre-generated first data may represent a digital order which has been pre-generated for easy transaction completion, including popular or in-demand orders. For example, a popular digital order may correspond to pre-generated first order data. The pre-generated first order data may be placed on a static medium, such as a printed poster. A user of a digital mobile device may capture second data representing an image of the first data from the poster, thereby causing the generation of third data representing the popular digital order to be sent to and displayed on the digital mobile device. The transaction may then be completed, and the order processed. In various further embodiments, the pre-generated first order data is displayed on a screen or other dynamic medium as part of a digital menu of possible orders which may be completed at a digital mobile device via process 200.

In some embodiments, all of FIG. 2 is programmed as a real-time, high-volume transaction system that can generate the first data for an order, receive the second data representing an image, determine that the images match, receive digital order data, receive approval and execute a transaction process for payment in rapid succession as a customer or user is at a kiosk or other point of sale at which goods are immediately delivered. For example, FIG. 2 may find practical application in sports stadiums or arenas, concert venues, theaters and similar venues that require fast, high-volume transaction throughput in real-time as customers are waiting for goods. In this context, embodiments achieve the practical application of increased transaction throughput and faster delivery of goods to customers as well as reduced use of network bandwidth, CPU and storage resources because fewer round-trip messages are needed to transmit code data representing orders, receive matching code data, display order details and complete payments as compared to the techniques outlined in the Background.

Figure 5:
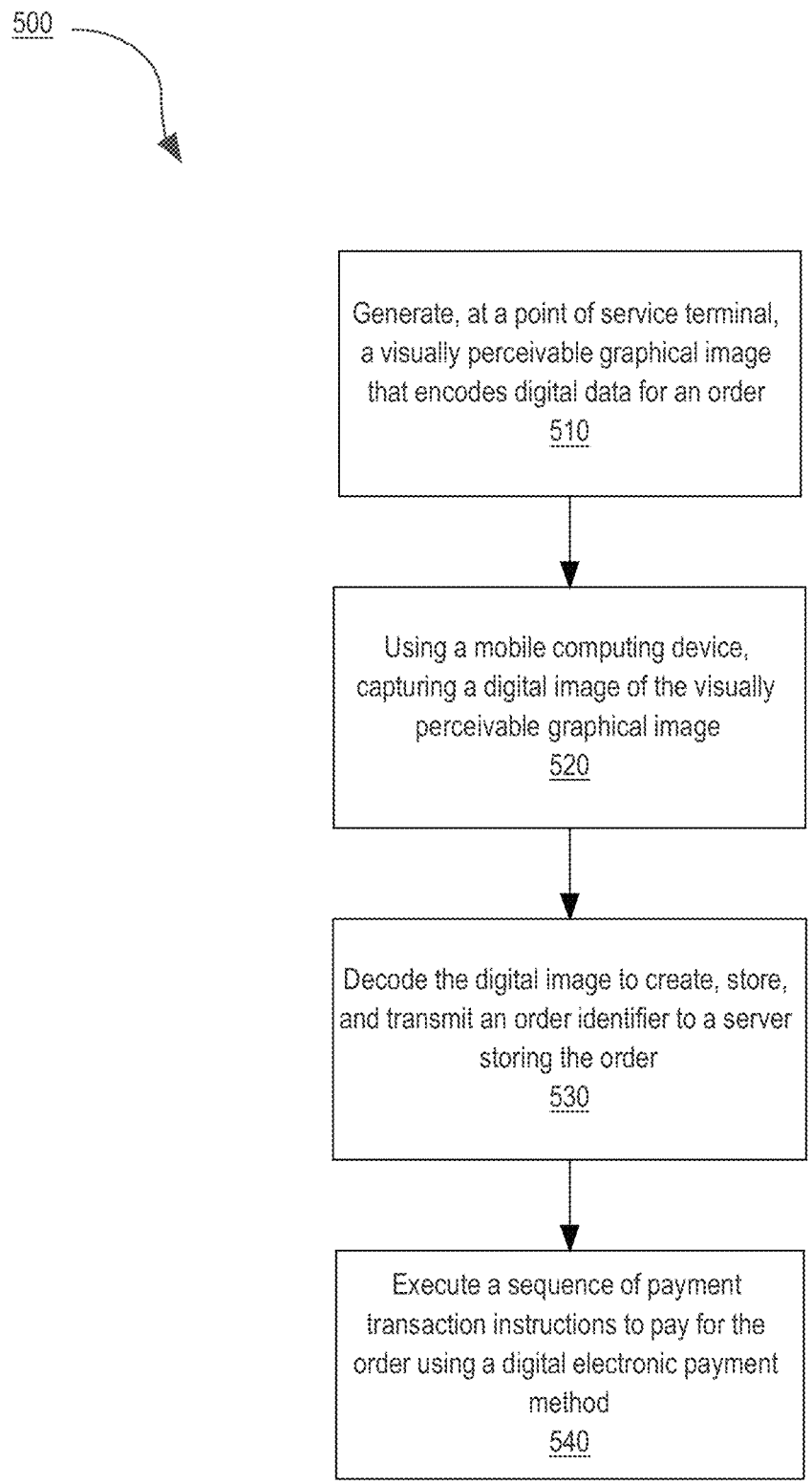
FIG. 5 illustrates an example code scanning and payment process according to an embodiment.

FIG. 5 illustrates an example code scanning and payment process according to an embodiment.

The example process 500 depicted in FIG. 5 starts generating, at a point of service terminal, a visually perceivable graphical image that encode digital data for an order. Using a mobile computing device, an image is captured comprising the visually perceivable graphical image. Decoding of the digital image is performed to create, store, and transmit an order identifier to a server storing the order. An execution of payment transaction instructions then begins to pay for the order using a digital electronic payment method.

Returning to FIG. 5, the process 500 begins at step 510 by generating, at a point of service terminal, a visually perceivable graphical image that encodes digital data for an order. In an embodiment, the point of sale terminal is coupled via a digital computer network to a server computer. The server computer may receive order data or a copy of the generated visually perceivable graphical image. In an embodiment, the POS terminal receives input of keystrokes on interactive buttons at a screen attached to the POS terminal. The input of buttons represent to addition of goods or services to the digital order. In various further embodiments, input specifying completion of the order is received by the POS system. In response to receiving the input specifying completion of the order, the digital order data and visually perceivable graphical image are generated. The encoded digital data represents an order, order data, an order identifier, or any other information sufficient to encode digital data for an order.

At step 520, the process comprises using a mobile computing device, capturing a digital image of the visually perceivable graphical image. The digital image may be a digital image taken from a camera on the mobile computing device. Use of the camera to capture the digital image may be a step in a mobile application that is designed to facilitate the digital transaction for goods or services. At step 530, the process comprises decoding the digital image to create, store, and transmit an order identifier to a server storing the order. In an embodiment, an application program executed at the mobile computing device performs the decoding step. In an embodiment, the created order identifier corresponds to information from the decoded digital image. In an embodiment, storing the order identifier comprises storing the created order identifier in memory at the mobile computing device. In an embodiment, transmitting the order identifier comprises sending the created order identifier to the server computer to compare the order identifier to another order identifier stored at the server computer. In an embodiment, the order identifier is verified at the server computer as a valid order identifier. In response to determining that the order identifier is valid, a response message may be sent to the mobile computing device that the order identifier is valid.

At step 540, the process comprises executing a sequence of payment transaction instructions to pay for the order using a digital electronic payment method. In an embodiment, the sequence of payment transaction instructions are executed in response to receiving the response message that the order identifier is valid. In an embodiment, the instructions to pay for the order using a digital electronic payment method comprise transmitting instructions to the server computer to pay for the order. In various further embodiments, the instructions to the server computer comprise payment information received from or associated with the mobile computing device which specify a method of payment for completing the transaction.

In some embodiments, the process of FIG. 5 may be programmed, in response to completing a transaction at step 540, to execute one or more real-time updates of inventory data values that are digitally stored and managed in an inventory database as part of data storage 116 or storage 126 (FIG. 1). For example, counts of inventory of products or services identified in an order, for which a payment was processed successfully, may be decremented to reflect consumption of the products or services reflected in the order.

In various embodiments not pictured in FIG. 5, a customer may input and generate some portion of an order at the mobile computing device. The generated order may be taken to a POS terminal or a kiosk to confirm the customer's generated order before creating the visually perceivable symbol to complete the transaction. For example, a user may input a personalized order at the mobile computing device. The order may then be transferred to a database, POS terminal or kiosk to modify the user's order into a standardized format. The receiving device may check the consistency of the order and approve the data received from the mobile computing device. The user may then interact with a kiosk, POS system, or other device to confirm the order was placed, scan the modified order data to receive order information at the mobile computing device, and complete the transaction using the systems and methods discussed herein.

4. Example Environments

Figure 6:
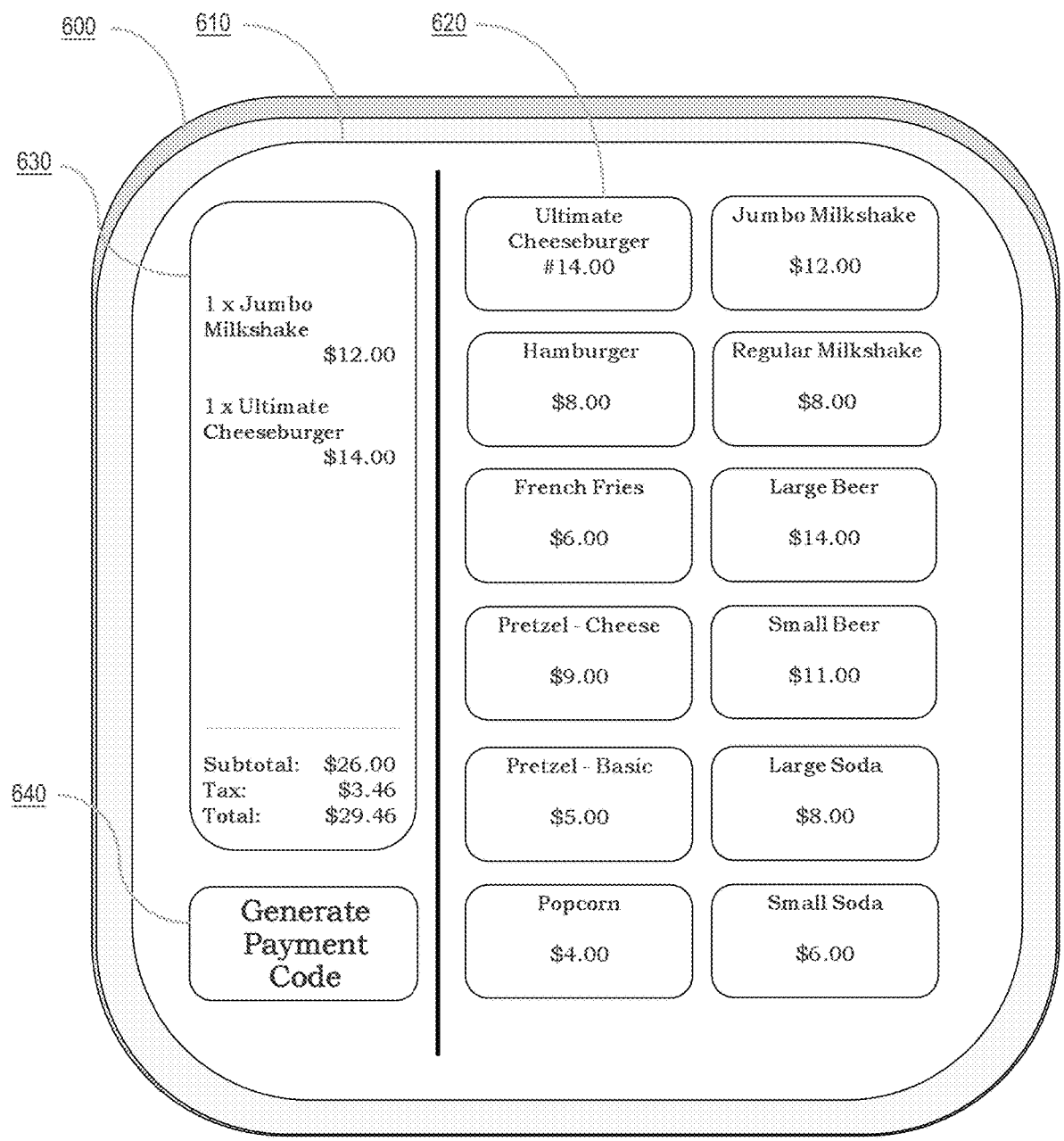
FIG. 6 illustrates an example code scanning and payment system according to an embodiment.

FIG. 6 illustrates an example code scanning and payment system according to an embodiment. Specifically, FIG. 6 illustrates a screen on a POS terminal during the generation of digital order data. POS terminal 600 may be any device capable of generating digital order data, such as a transaction generation device 104. POS terminal 600 is shown here as a device comprising a screen and chassis to hold the screen, however any device which is sufficient to function as a POS terminal may be used. POS terminal 600 comprises an input screen 610 upon which a user of POS terminal 600 may interact with an interface, such as an interface generated by interface instructions 108. Input screen 610 may be a touchscreen that is simultaneously capable of displaying and receiving input to the screen.

Input screen 610 may contain thereon any number of visual items or interactive icons which facilitate the generation of a digital order and first data representing the digital order. The interface illustrated in FIG. 6 shows input buttons 620, order list 630 and generation button 640 as examples. Input button 620 may be any interactive input with which a user may interact with input screen 610 to facilitate the generation of a digital order. For example, FIG. 6 illustrates input button 620 as a button on a touchscreen of a POS terminal having the text "Ultimate Cheeseburger $14.00." This button may represent an input which will add a food item such as an "Ultimate Cheeseburger" to a list of goods for the digital order. The price specification of "$14.00" may add a price value to a cumulative list of pricing items that will be the subject of the later transaction.

Order list 630 may be any static or interactive displayed list showing a number of items which are currently part of a potential digital order. For example, FIG. 6 illustrates order list 630 as a digital list containing the items "Ultimate Cheeseburger $14.00," and "Jumbo Milkshake $12.00." The addition of these items to the list may be made in response to interactive input of corresponding input buttons 620 on the input screen 610. In an embodiment, order list 630 contains the cumulative pricing information for items which are added to the list. For example, order list 630 shows "Subtotal," "Tax" and "Total" fields representing the cumulative prices of all items in the list. In an embodiment, a user may interact with the order list 630 to add or remove items or change the orientation of size of the list in response to some user input. Generation button 640 may be an interactive button that finalizes an order and begins process 200 when pressed. For example, when a user is satisfied with the contents of order list 630, they may press generation button 640 labeled "Generate Payment Code" to begin generating the first data which will be used to complete the transaction of a mobile device.

Figure 7:
FIG. 7 illustrates an example code scanning and payment system according to an embodiment.

FIG. 7 illustrates an example code scanning and payment system according to an embodiment. Specifically, FIG. 7 illustrates a screen on a POS terminal during the displaying of a unique symbol representing the digital order data generated by POS terminal 600. POS terminal 700 may be similar to POS terminal 600 or different. For example, POS terminal 700 may be a different device or a different portion of the same device as POS terminal 600. Display screen 710 may be similar to input screen 610 or different in a similar fashion. In an embodiment, POS terminal 700 and input screen 710 are devices which face a customer and POS terminal 600 and input screen 610 are devices which face an operator/vendor.

Application payment sector 720 represents an interactive area of display screen 710 in which user input will initiate the process of displaying the unique symbol. For example, in response to receiving customer input selecting application payment sector 720, a large version of the generated first data will be displayed on input screen 710. In an embodiment, selection of the application payment sector 720 will cause displaying a QR CODE which represents the customer's order for the customer to capture a digital image of. In an embodiment, the first data is displayed as part of the displayed portion of application payment sector 720. For example, FIG. 7 illustrates a copy of a QR CODE as the first data displayed in the application payment sector 720. In response to selection of the application payment sector 720 by a customer, the QR code may enlarge or a separate screen displaying a resized version of the QR CODE may be shown.

In an embodiment, a customer may forego completing the transaction on a mobile device to pay manually at a POS terminal such as POS terminal 700. Card payment sector 730 represents an interactive area of display screen 710 in which user input will initiate a traditional payment process such as credit card reading or cash transactions. For example, if a user does not have a mobile computing device or does not wish to initiate the transaction using a mobile computing device, a user may select card payment sector 740 to complete the transaction manually with a credit or debit card. In an embodiment, POS terminal 700 comprises transactional equipment capable of recognizing and processing credit card or cash payments. In an embodiment, the generated digital order data is stored temporarily at POS terminal 700 so that the terminal may access the information for credit card payment in the event a networked server is inoperative or to reduce downtime with transferring data to the server.

In various embodiments not pictured in FIG. 7, completing an order by selecting application payment sector 720 may being a countdown timer for a human operator to complete an order. The payment time may specify a period of time during which a user may complete a transaction for the digital order. In various embodiments, the countdown timer is presented at a user's digital mobile device to show them an amount of remaining time before an order "times-out," meaning the order can no longer be completed and must be re-initiated at a POS system or kiosk. In various embodiments, the countdown time is displayed at an autonomous kiosk in response to a user completing the order at the digital kiosk. In various embodiments, the user may manually cause input at a digital mobile device or autonomous kiosk, the input indicating that a digital order can been completed during the pendency of the countdown timer and is therefore constitutes a valid transaction.

FIG. 8 illustrates an example code scanning and payment system according to an embodiment. Specifically, FIG. 8 the process of scanning a unique symbol displayed at POS terminal 700 with a mobile computing device such as mobile device 800. Mobile device 800 comprises mobile screen 810 which displays visual information and/or an interface that facilitates the digital transaction process. As shown in FIG. 8, mobile screen 810 displays thereon scan window 820 depicting an area in which a digital image must include a unique symbol to initiate the digital transaction process. Scan window 820 may be displayed as part of a mobile digital application executing on mobile device 800 to facilitate the digital transaction for goods. As illustrated in FIG. 8, a user is utilizing mobile device 800 to scan first data from POS terminal 700 which is represented in the form of a QR CODE. In an embodiment, the QR CODE displayed on POS terminal 700 is an enlarged QR CODE which is displayed after selecting application payment sector 720.

As illustrated in FIG. 8, the user is instructed by a digital application execution on mobile device 800 to "Center the Code on the Screen to begin the Transaction." In an embodiment, scan window 820 displays a digital image preview of the currently captured digital image from a camera attached to mobile device 800. In an embodiment, the digital application executing at mobile device 800 will only scan and decode data which appears in the digital image preview shown in scan window 820. In an embodiment, scan window 820 comprises a transparent overlay of first data such as a QR CODE to guide a user of the digital application toward a portion of the scan window 820 in which to center the first data displayed on POS terminal 700.

FIG. 9 illustrates an example code scanning and payment system according to an embodiment. Specifically, FIG. 9 illustrates an example interface from which a user of mobile device 800 may complete the digital transaction process using mobile screen 810. In an embodiment, a digital application executing on mobile device 800 allows a user to specify payment methods and protocols prior to scanning the first data. For example, scan window 820 is displayed as ready to accept a digital image comprising the first data, although a user may specify or view other information prior to scanning the first data. Reward slider 900 represents a field which accepts user input to specify whether a transaction will involve use of a distinct currency, such as rewards credits. For example, reward slider 900 represents a binary option for a user to pay for a transaction using digital currency that has accumulated in the digital application. A user may slide the binary slider to a positive or negative position on the screen depending on the user's preference to user digital rewards credits as part of a transaction.

Once the settings for slider 900 are set, the scan window 820 may capture the unique symbol to receive the digital data representing the digital order. In an embodiment, payment for an order may comprise using a combination of currency and digital currency. For example, when a number of accumulated rewards points total less than the price of an order, the transaction process may use some or all of the rewards points to offset a portion of the transactional amount due and fulfill the resulting balancing with payment from a credit card or other payment method on file. Reward information field 910 displays information relating to user data or a profile which may be associated with the distinct currency. For example, reward information field 910 displays information regarding a membership associated with the digital application executing at mobile device 800 which may have bearing on the transaction. Once the first data has been scanned and the order has been verified, mobile device 800 may then display the contents of the order, which may have been modified by the information represented in reward information field 910.

Figure 10:
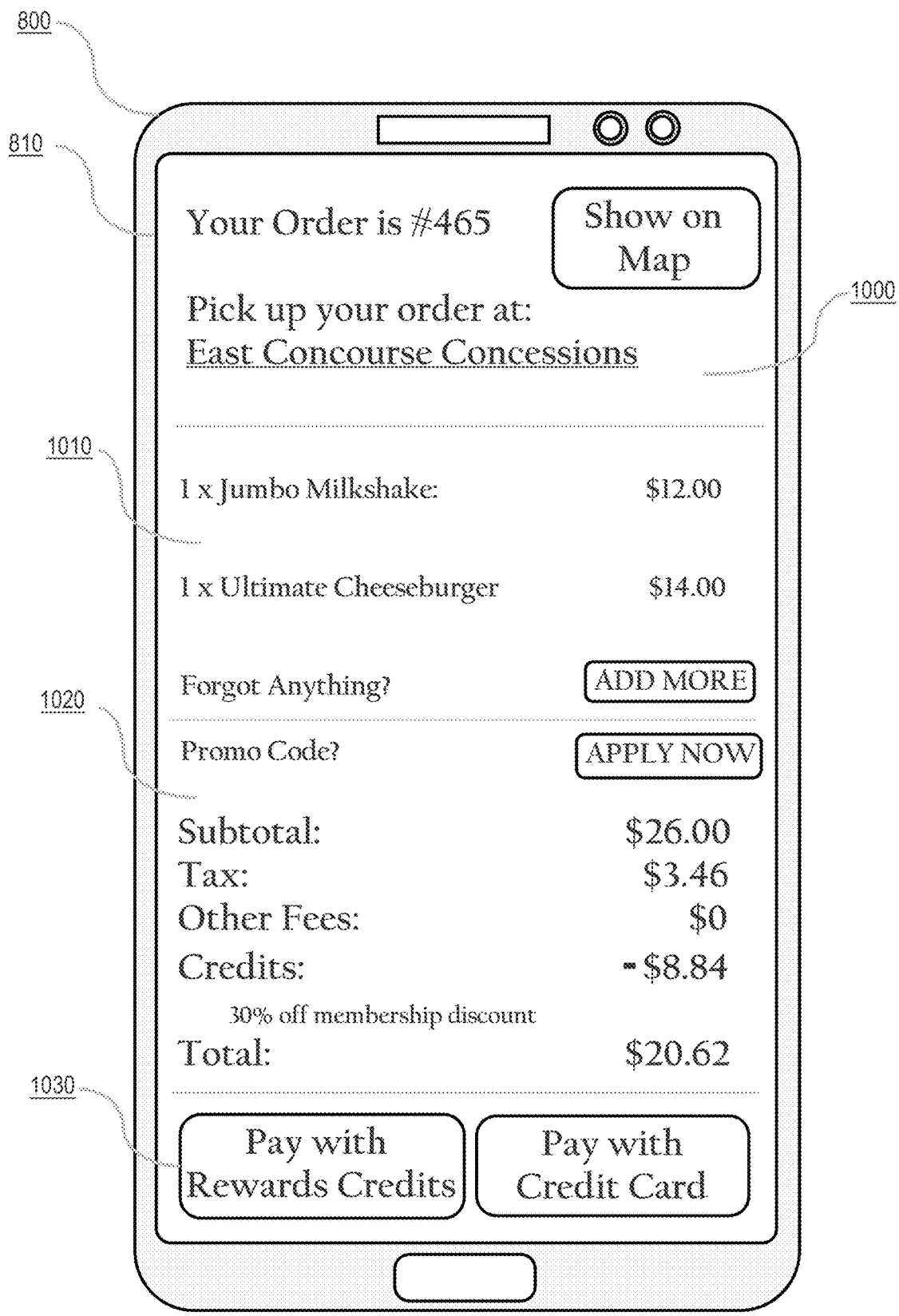
FIG. 10 illustrates an example code scan and payment system according to an embodiment.

FIG. 10 illustrates an example code scan and payment system according to an embodiment. Specifically, FIG. 10 illustrates received digital order data displayed on mobile device 800. Mobile screen 810 depicts multiple viewable aspects of a received digital order. For example, geographic information 1000 may depict information relating to a location or queue number in which an order may be completed. The information displayed at geographic information 1000 may convey to a user the status of their order or the location they must move to received goods or services. For example, geographic information 1000 depicts a signifier that "Your Order is #465" and to "Pick up your order at: East Concourse Concessions."

In an embodiment, the text displayed in geographic information 1000 is interactive. Selection of an interactive element of geographic information 1000 may specify further information relating to an order. For example, selecting the text "#465" may display an estimated wait time before the goods are ready for pick up. Selecting the text "East Concourse Concessions" may display a set of instructions for navigating to a vendor station named "East Concourse Concessions." As depicted in FIG. 10, a map button may also be shown in geographic information 1000 which contains a listing of all areas where goods may be purchases. In an embodiment, GPS, wireless triangulation, or another other method of geographic location may be used to assist a user in navigating a map to obtain goods or services purchased in an order.

Order list information 1010 may depict a listing of the goods and/or services which are the subject of received digital order data. For example, as depicted in FIG. 10, order list information 1010 shows a copy of the digital order generated in FIG. 6 including a "Jumbo Milkshake" and an "Ultimate Cheeseburger." In an embodiment, order list information 1010 contains some interactive elements which allow a user to modify an order before the transaction is complete. For example, FIG. 10 depicts an interactive button labeled "ADD MORE" which will allow a user to retroactively add items to their order before the transaction is complete. Payment information 1020 may depict an area in which payment information and specific currency information are displayed to convey to a user the nature of a pending transaction.

In an embodiment, payment information 1020 depicts information on a transaction which is subject to some modification based on the nature of the digital application or a user profile. For example, as depicted in FIG. 10, the prices of the transaction have been modified based on the displayed information from rewards information field 910. Alteration data such as the information presented in rewards information field 910 may result in an altered digital order based on altered digital order data. Payment buttons 1030 may depict interactive buttons on mobile screen 810 which complete the digital transaction process when pressed. In an embodiment, a user may select whether to complete the payment with a digital currency or a traditional method such as credit or debit card.

In various embodiments not pictured in FIG. 10, order list information 1010 may further comprise a nested set of items or a nested set of modifiers for an item. For example, another embodiment of order list information 1010 may comprise a combination of items, the combination of items represented as a singular item on the list with a price and a number of nested items comprising the combination item. A nested set of modifiers may represent an item on order list information 1010. As an example, the Ultimate Cheeseburger item depicted in FIG. 10 may be further modified by a set of modifiers such as "No Ketchup" or "Extra Bacon" nested beneath the main item which describe elements of an item in order list information 1010. In various embodiments, one or more item variants may be specified by an order and displayed on order list information 1010. For example, an item labelled "Beer" may be included in anther embodiment of order list information 1010. A variant modifier may be specified next to or nested within the item specifying "Beer" to describe a type or size of the "Beer" item that is part of the digital order.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
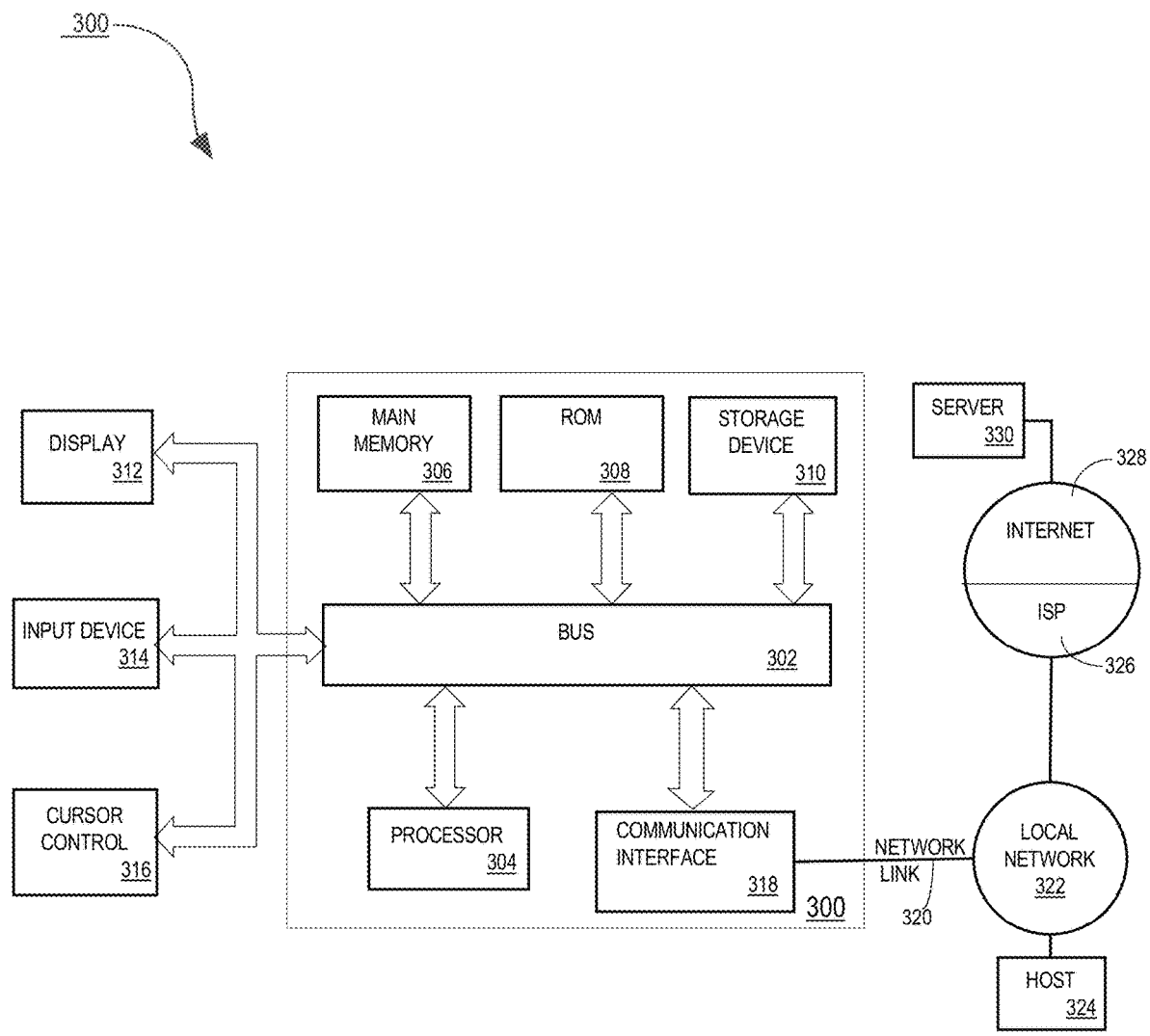
FIG. 3 illustrates an example computer system with which an embodiment may be implemented.

For example, FIG. 3 is a block diagram that illustrates a computer system 300 upon which an embodiment may be implemented. Computer system 300 includes a bus 302 or other communication mechanism for communicating information, and a hardware processor 304 coupled with bus 302 for processing information. Hardware processor 304 may be, for example, a general-purpose microprocessor.

Computer system 300 also includes a main memory 306, such as a random-access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Non-volatile media may also include persistent memory, such as MRAM or PCM, like 3DXPoint from Intel which can be used as a part of main memory. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 930 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Software Overview

Figure 4:
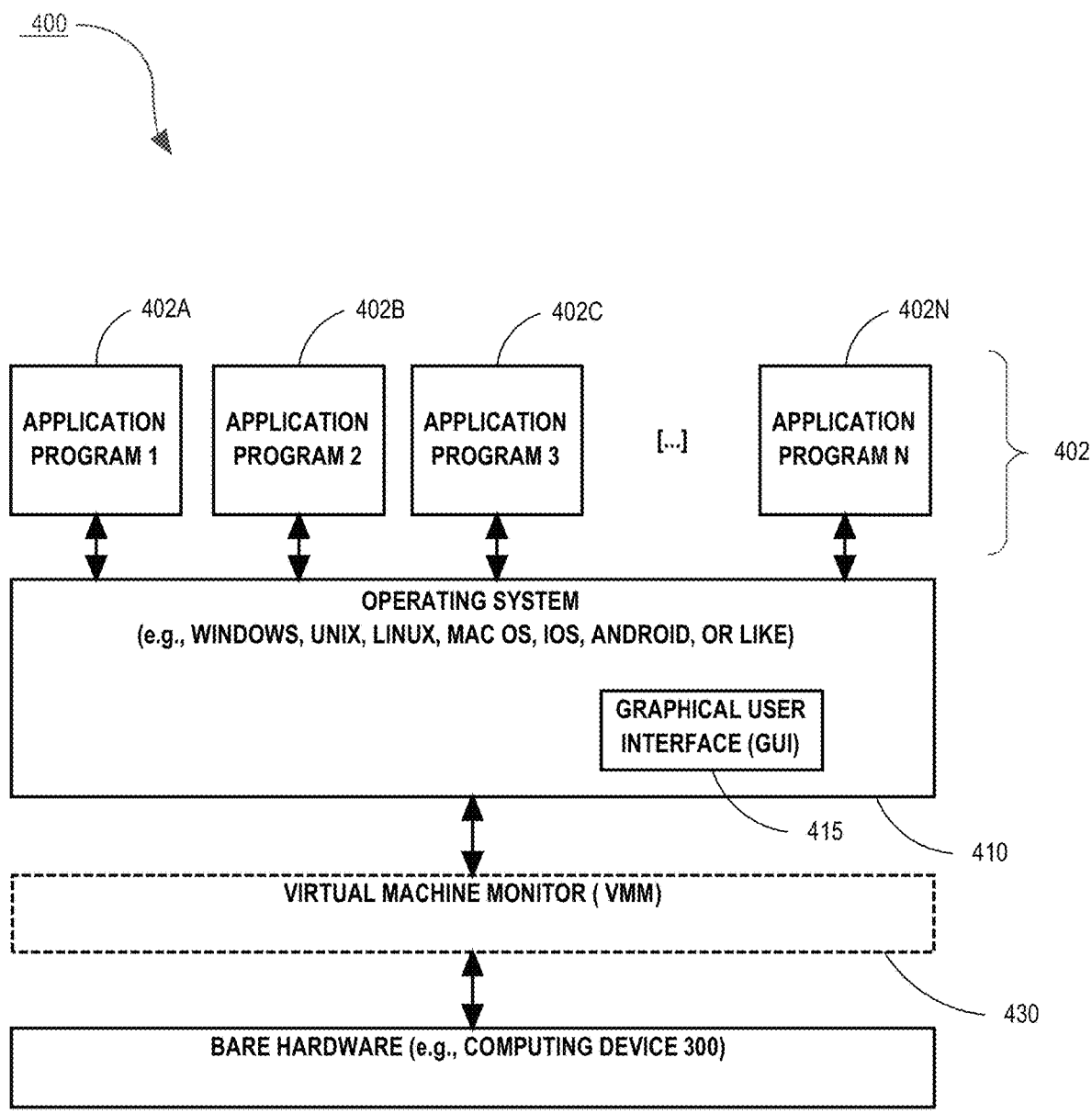
FIG. 4 illustrates a graphical user interface capture of a digital image and corresponding search embodiment.

FIG. 4 is a block diagram of a software system 400 that may be employed for controlling the operation of computer system 400. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computer system 500. Software system 400, which may be stored in system memory (RAM) and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage into memory) for execution by the system. The applications or other software intended for use on system may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 300 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on bare hardware (e.g., processor(s)) utilizing system 400. Alternatively, a hypervisor or virtual machine monitor (VMM) 430 may be interposed between the bare hardware and the OS 410. In this configuration, VMM 430 acts as a software "cushion" or virtualization layer between the OS 410 and the bare hardware of the system.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware of a system directly. In these instances, the same version of the guest operating system configured to execute on the bare hardware directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

7. Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

8. Benefits and Practical Applications

In some embodiments, the processes of FIG. 2 and FIG. 5, and the sequence of displays of FIG. 6 to FIG. 10 inclusive, are programmed as part of a real-time, high-volume distributed transaction processing computer system that can generate the first data for an order, receive the second data representing an image, determine that the images match, receive digital order data, receive approval and execute a transaction process for payment in rapid succession as a customer or user is at a kiosk or other point of sale at which goods are immediately delivered. For example, FIG. 2 and FIG. 5 may find practical application in sports stadiums or arenas, concert venues, theaters and similar venues that require fast, high-volume transaction throughput in real-time as customers are waiting for goods. In this context, embodiments achieve the practical application of increased transaction throughput and faster delivery of goods to customers as well as reduced use of network bandwidth, CPU and storage resources because fewer round-trip messages are needed to transmit code data representing orders, receive matching code data, display order details and complete payments as compared to the techniques outlined in the Background.

The systems and methods described herein provide benefits and practical applications to all entities involved in high-volume venue transactions, including customers, vendors, vending employees, and transaction processing entities. With respect to customers, the implementation of the systems and methods described herein improve the field of high-volume venue transactions by increasing customer throughput on generating, approving and completing order information. The reduction of customer order throughput allows customers to complete transactions on a second device separate from a POS terminal or kiosk used to generate the order. Because each customer has an individual mobile device on which approval and completion can be made, a customer need not wait for a vending employee to confer with the customer to complete an order. The ability for a customer to independently approve or modify an order at a mobile device allows the customer to minimize human error frequently present during the order generation and payment process with a vending employee.

In embodiments in which a customer may move to another location to complete a purchase, such as picking up concession or merchandise goods at a separate location, the customer can complete the transaction en-route to the location, increasing customer order efficiency. The consolidation of the transaction approval process also allows consolidation of important transaction information in a mobile device where a customer may also view other pertinent information, such as pick-up locations, vendor locations, kiosk locations, or information pertinent to a venue at which the systems and methods are implemented.

With respect to vendors, the implementation of the systems and methods described herein improve the field of high-volume venue transactions by increasing throughput at POS terminals and kiosks. The reduction of traditional payment processes at POS terminals allows for more streamlined transactional systems to be used, saving vendors costs for equipment, bandwidth and human labor. Higher throughput of order completion further allows a vendor to process a higher number of transactions in a shorter amount of time. The further digitization of the transaction system for goods and services at high-volume events allows vendors to implement more autonomous kiosk systems for customer use, lowering labor costs including complicated payment training for vending employees as well as improving customer interactions.

With respect to vending employees, the implementation of the systems and methods described herein improve the field of high-volume venue transactions by requiring less training and job-task requirements to complete a transaction with a customer. Streamlining vending employee tasks to the generation of an order and a digital code reduces the possible inclusion of human error in transactions and increases throughput, allowing vending employees to clear a queue of customers faster and more efficiently.

With respect to transaction processing entities, the implementation of the systems and methods described herein improve the field of high-volume venue transactions in a variety of logistic and technical manners. The increased throughput and lowered human error rates improve the functioning of backend technology for the entity by reducing the amount of erroneous data which must be identified and modified. The reduction in error-handling further reduces the use of necessary computing resources devoted to fix errors, such as processor cycles to find and modify errors and electronic database memory storage required to hold and replace erroneous data. The increased throughput of digital transactions allows electronic resources to be more efficiently utilized. As order queues decrease and individual mobile devices handle an increased number of transaction process steps, database management systems and resources can streamline tasks such as generating digital symbol data and matching symbol data, alleviating processor and memory strains previously attributable to transaction completion. Electronic resources are better utilized with decreases in queue sizes, as previously idle resources can be further utilized to improve order throughput and improve customer experiences.

What is claimed is:
1. A computer-implemented method comprising:
  generating, by a first device comprising a screen, visually perceivable first data encoding information that identifies a digital order of a set of goods or services;
  causing displaying, on the screen of the first device, the visually perceivable first data encoding the information that identifies the digital order;
  receiving, by a second device, second data representing a first digital image;
  determining that the second data comprises a digital image corresponding to the first data;
  in response to determining that the second data comprises a digital image corresponding to the first data:
    receiving, by the second device, third data representing the digital order;

causing displaying the digital order on a display screen of the second device;

receiving, at the second device, an indication of approval of the third data;

in response to receiving the indication of approval, initiating a transaction process for digital payment of the set of the goods or services.

2. The computer-implemented method of claim 1, wherein:

the first data representing the digital order is a unique symbol recognizable by the second device;

causing displaying the first data comprises causing displaying the unique symbol on the screen of the first device;

determining that the second data comprises a digital image corresponding to the first data comprises determining that the first digital image represented by the second data comprises the unique symbol.

3. The computer-implemented method of claim 1, wherein:

the second device comprises a camera capable of generating a first digital image in real-time;

receiving second data representing a first digital image comprises receiving, from the camera, the first digital image in real-time;

determining that the second data comprises a digital image corresponding to the first data comprises determining that the first digital image representing the second data received from the camera in real-time comprises the first data.

4. The computer-implemented method of claim 1, further comprising:

in response to determining that the second data comprises a digital image corresponding to the first data, generating a countdown timer for the indication of approval of the third data;

wherein initiating the transaction process for digital payment is performed in response to receiving the indication of approval within a pendency of the countdown timer.

5. The computer-implemented method of claim 1, further comprising:

selecting, at the first device, from a list of items for purchase, a set of items for purchase, wherein the digital order is the selected set of items for purchase;

creating, by the first device, a digital purchase list including the selected set of items;

wherein the third data received by the second device is the digital purchase list.

6. The computer-implemented method of claim 1, further comprising:

sending, from the first device to a storage device comprising a computer memory, the first data representing the digital order and the third data representing the digital order;

storing, by the storage device, the first data and the third data in the computer memory;

sending, from the second device to the storage device, the second data representing the first digital image;

wherein determining that the second data comprises a digital image corresponding to the first data is performed by the storage device;

in response to determining that the second data comprises a digital image corresponding to the first data, sending, from the storage device to the second device, the third data representing the digital order.

7. The computer-implemented method of claim 1, further comprising:

causing displaying, at the screen of the first device, a selectable icon for generating the first data representing the digital order;

receiving, by the first device, an indication of selection of the icon for generating the first data representing the digital order;

wherein generating the first data representing the digital order is performed in response to receiving the indication of selection of the icon.

8. The computer-implemented method of claim 1, further comprising:

receiving fourth data corresponding to one or more alterations to be made to digital orders;

generating fifth data representing an altered digital order based, at least in part, on the third data and the fourth data;

causing displaying, at the second device, the fifth data representing the altered digital order.

9. The computer-implemented method of claim 1, further comprising:

receiving, by a third device comprising a screen, transference data representing a second digital photograph, the second digital photograph comprising a digital image corresponding to the first data;

generating, by the third device, a copy of the first data representing the digital order;

causing displaying, at the screen of the third device, the copy of the first data representing the digital order;

wherein the first digital image represented by the second data is a digital photograph of the copy of the first data displayed at the third device.

10. The computer-implemented method of claim 1, further comprising:

determining that the transaction process for digital payment of the set of the goods or services is complete;

wherein the digital order is a first digital order;

associating the first data with a second digital order, wherein the first data represents the second digital order and not the first digital order.

11. One or more non-transitory computer-readable media storing instructions which, when executed by one or more processors, cause:

while a first device displays, on a screen of the first device, first data encoding information that identifies a digital order of a set of goods or services, receiving, by a second device that is different than the first device, second data representing a first digital image;

determining that the second data comprises a digital image corresponding to the first data;

in response to determining that the second data comprises a digital image corresponding to the first data:

receiving, by the second device, third data representing the digital order;

causing displaying the digital order on a display screen of the second device;

receiving, at the second device, an indication of approval of the third data;

in response to receiving the indication of approval, initiating a transaction process for digital payment of the set of the goods or services.

12. The one or more non-transitory computer-readable media of claim 11, wherein:

the first data representing the digital order is a unique symbol recognizable by the second device;

determining that the second data comprises a digital image corresponding to the first data comprises determining that the first digital image represented by the second data comprises the unique symbol.

13. The one or more non-transitory computer-readable media of claim 11, wherein:
the second device comprises a camera capable of generating a first digital image in real-time;
receiving the second data representing the first digital image comprises receiving, from the camera, the first digital image in real-time;
determining that the second data comprises the digital image corresponding to the first data comprises determining that the first digital image representing the second data received from the camera in real-time comprises the first data.

14. The one or more non-transitory computer-readable media of claim 11, wherein the instructions, when executed by the one or more processors, further cause:
in response to determining that the second data comprises the digital image corresponding to the first data, generating a countdown timer for the indication of approval of the third data;
wherein initiating the transaction process for digital payment is performed in response to receiving the indication of approval within a pendency of the countdown timer.

15. The one or more non-transitory computer-readable media of claim 11, wherein:
the digital order is a selected set of items for purchase;
the first device creates a digital purchase list including the selected set of items;
the third data received by the second device is the digital purchase list.

16. The one or more non-transitory computer-readable media of claim 11, wherein the instructions, when executed by the one or more processors, further cause:
sending, from the first device to a storage device comprising a computer memory, the first data representing the digital order and the third data representing the digital order;
storing, by the storage device, the first data and the third data in the computer memory;
sending, from the second device to the storage device, the second data representing the first digital image;
wherein determining that the second data comprises the digital image corresponding to the first data is performed by the storage device;
in response to determining that the second data comprises the digital image corresponding to the first data, sending, from the storage device to the second device, the third data representing the digital order.

17. The one or more non-transitory computer-readable media of claim 11, wherein the instructions, when executed by the one or more processors, further cause:
causing displaying, at the screen of the first device, a selectable icon for generating the first data representing the digital order;
receiving, by the first device, an indication of selection of the icon for generating the first data representing the digital order;
wherein generating the first data representing the digital order is performed in response to receiving the indication of selection of the icon.

18. The one or more non-transitory computer-readable media of claim 11, wherein the instructions, when executed by the one or more processors, further cause:
receiving fourth data corresponding to one or more alterations to be made to digital orders;
generating fifth data representing an altered digital order based, at least in part, on the third data and the fourth data;
causing displaying, at the second device, the fifth data representing the altered digital order.

19. The one or more non-transitory computer-readable media of claim 11, wherein the instructions, when executed by the one or more processors, further cause:
receiving, by a third device comprising a screen, transference data representing a second digital photograph that comprises a particular digital image corresponding to the first data;
generating, by the third device, a copy of the first data representing the digital order;
causing displaying, at the screen of the third device, the copy of the first data representing the digital order;
wherein the first digital image represented by the second data is a digital photograph of the copy of the first data displayed at the third device.

20. The one or more non-transitory computer-readable media of claim 11, wherein the instructions, when executed by the one or more processors, further cause:
determining that the transaction process for digital payment of the set of the goods or services is complete;
wherein the digital order is a first digital order;
associating the first data with a second digital order, wherein the first data represents the second digital order and not the first digital order.

* * * * *